United States Patent
Guo et al.

(10) Patent No.: US 10,015,529 B2
(45) Date of Patent: Jul. 3, 2018

(54) VIDEO IMAGE QUALITY DIAGNOSTIC SYSTEM AND METHOD THEREOF

(71) Applicant: HANGZHOU HIKVISION DIGITAL TECHNOLOGY CO., LTD., Hangzhou, Zhejiang (CN)

(72) Inventors: Bin Guo, Hangzhou (CN); Xian Chen, Hangzhou (CN)

(73) Assignee: HANGZHOU HIKVISION DIGITAL TECHNOLOGY CO., LTD., Hangzhou, Zhejiang (CN)

( * ) Notice: Subject to any disclaimer, the term of this patent is extended or adjusted under 35 U.S.C. 154(b) by 512 days.

(21) Appl. No.: 14/436,306

(22) PCT Filed: Nov. 16, 2012

(86) PCT No.: PCT/CN2012/084782
§ 371 (c)(1),
(2) Date: Apr. 16, 2015

(87) PCT Pub. No.: WO2014/059723
PCT Pub. Date: Apr. 24, 2014

(65) Prior Publication Data
US 2015/0281748 A1    Oct. 1, 2015

(30) Foreign Application Priority Data

Oct. 17, 2012    (CN) .......................... 2012 1 0395171

(51) Int. Cl.
*H04N 21/234*    (2011.01)
*H04N 7/18*    (2006.01)
(Continued)

(52) U.S. Cl.
CPC ... *H04N 21/23418* (2013.01); *G06K 9/00771* (2013.01); *G06K 9/036* (2013.01);
(Continued)

(58) Field of Classification Search
CPC .. G06K 9/00771; G06K 9/036; H04N 17/002; H04N 17/06; H04N 21/222; H04N 21/23418; H04N 7/18; H04N 7/181
See application file for complete search history.

(56) References Cited

U.S. PATENT DOCUMENTS

2006/0179463 A1    8/2006    Chisholm et al.
2010/0177176 A1    7/2010    Hengstler

FOREIGN PATENT DOCUMENTS

| CA | 2237654 | 12/1998 |
| CN | 101594539 | 12/2009 |

(Continued)

OTHER PUBLICATIONS

Supplemental European Search Report issued for corresponding European Application No. 12886723.1, dated Dec. 3, 2015, 5 pages.
(Continued)

*Primary Examiner* — Anner N Holder
(74) *Attorney, Agent, or Firm* — Hamre, Schumann, Mueller & Larson, P.C.

(57) ABSTRACT

The present invention relates to the technical field of video monitoring application, disclosed are a video image quality diagnostic system and method thereof. In the present invention, on the basis of a video monitoring system, the video image quality diagnostic system is incorporated into the video monitoring system as a dedicated diagnostic network, thus effectively reducing the bandwidth consumption of the video monitoring system and the connecting port consumption of a monitoring device. A polling host polls each video monitoring point via software to view a video image, acquires a code stream, and simultaneously transmits the same code stream to a video image quality diagnostic server for diagnosis via the dedicated diagnostic network; the transmission of the code stream does not occupy the bandwidth of the video monitoring network. While polling each (Continued)

video monitoring point to view the video image, the polling host takes a screenshot of the software interface, segments the screenshot image, and then transmits the image to the video image quality diagnostic server for diagnosis via the dedicated diagnosis network, thus further reducing the bandwidth consumption of the dedicated diagnostic network.

13 Claims, 8 Drawing Sheets

(51) Int. Cl.
  H04N 17/00 (2006.01)
  H04N 17/06 (2006.01)
  H04N 21/222 (2011.01)
  G06K 9/00 (2006.01)
  G06K 9/03 (2006.01)

(52) U.S. Cl.
  CPC .............. *H04N 7/18* (2013.01); *H04N 7/181* (2013.01); *H04N 17/002* (2013.01); *H04N 17/06* (2013.01); *H04N 21/222* (2013.01)

(56) References Cited

FOREIGN PATENT DOCUMENTS

| CN | 101656874 | 2/2010 |
|---|---|---|
| CN | 101873487 | 10/2010 |
| CN | 101883257 | 11/2010 |
| CN | 102006459 | 4/2011 |
| CN | 102118629 | 7/2011 |
| CN | 102131101 | 7/2011 |
| CN | 102160375 | 8/2011 |
| CN | 102176758 | 9/2011 |
| CN | 202085261 | 12/2011 |
| CN | 102387038 | 3/2012 |
| CN | 202282837 | 6/2012 |
| CN | 102572508 | 7/2012 |

OTHER PUBLICATIONS

European Examination Report issued for corresponding European Application No. 12886723.1, dated Oct. 7, 2016, 6 pages.
European Examination Report issued for corresponding European Application No. 12886723.1, dated Mar. 28, 2017, 8 pages.
Office Action issued for priority Chinese Patent Application No. 201210395171.X dated Jun. 28, 2016, 12 pages.
Office Action issued for priority Chinese Patent Application No. 201210395171.X dated Nov. 8, 2016, 9 pages.
Office Action issued for priority Chinese Patent Application No. 201210395171.X, dated May 2, 2017, 11 pages.
International Search Report for application No. PCT/CN2012/084782, dated Jul. 25, 2013 (4 pages).

VIDEO IMAGE QUALITY DIAGNOSTIC SYSTEM AND METHOD THEREOF

This application claims the priority of Chinese Patent Application No. 201210395171.X, filed on Oct. 17, 2012, the content of which is incorporated herein by reference in its entirety.

TECHNICAL FIELD

The present invention relates to the technical field of video monitoring application, especially to the video image quality diagnosis technology.

BACKGROUND

In the closest priory art of the present invention, there is a Chinese patent application named Video Image Intelligent Diagnostic System and Method thereof with an application No. 201010536519.3. The solution of the patent application relates to a video image intelligent diagnostic system, comprising: a video data accessing interface for accessing a real-time video image transmitted from each monitoring point; an intelligent image analyzing unit for intelligently analyzing the real-time video image in a polling way; an anomalies standard comparing unit for determining the quality of a video image by comparing the image with the standard units of various video image anomalies, respectively; a failure alarming unit for generating the video image fault alarm information and notifying it to the system administrator when it is determined that there is a problem.

Traditionally, video image diagnostic system is designed in isolation, and the video monitoring system and the video image diagnostic system are not considered together. The video monitoring system itself needs to get code streams from each monitoring point to polling view video images, and the video image diagnostic system also needs to get code streams from each monitoring point for polling diagnosing images. That is, the existing video image diagnostic system may cause more bandwidth consumption and the connecting port consumption of the monitoring point device.

SUMMARY OF THE INVENTION

The present invention provides a video image quality diagnostic system and method thereof, which can reduce the bandwidth consumption of the video monitoring system and the connecting port consumption of the monitoring device.

To solve at least one of the above technical problems, one embodiment of the present invention discloses a video image quality diagnostic system, comprising: a video monitoring system and a video image quality diagnostic server;

the video monitoring system includes at least two video monitoring points and at least one polling host;

the polling host is configured to poll each video monitoring point to acquire video streams and then perform the video preview, and send the acquired video streams to the video image quality diagnostic server.

the video image quality diagnostic server is configured to receive the video streams and perform the video image quality diagnosis on at least part of the received video streams.

One embodiment of the present invention also discloses a video image quality diagnostic system, comprising: a video monitoring system and a video image quality diagnostic server;

the video monitoring system includes at least two video monitoring points and at least one polling host;

the polling host is configured to poll each video monitoring point to acquire video streams and then perform the video preview, and take a screenshot on the preview screen and segment a screenshot image to obtain the image corresponding to each video monitoring point, and sending the obtained image to the video image quality diagnostic server;

the video image quality diagnostic server is configured to receive the image and perform the video image quality diagnosis on the received images.

One embodiment of the present invention also discloses a video image quality diagnostic system, comprising: a video monitoring system and a video image quality diagnostic server;

the video monitoring system includes at least two video monitoring points and at least one polling host;

the polling host is configured to poll each video monitoring point to acquire video streams and perform the video preview, and store the polling video of the corresponding monitoring point, then send the stored polling video to the video image quality diagnostic server during the network trough;

the video image quality diagnostic server is configured to receive the polling video and perform the video image quality diagnosis on a received polling video.

One embodiment of the present invention also discloses a video image quality diagnostic system, comprising: a video monitoring system and a video image quality diagnostic module;

the video monitoring system includes at least two video monitoring points and at least one polling host;

the polling host is configured to poll each video monitoring point to acquire video streams and perform the video preview;

the video image quality diagnostic module embedded in an image capture device of the video monitoring point is configured to perform video image quality diagnosis on the image captured by the image capture device.

One embodiment of the present invention also discloses a video image quality diagnostic method, comprising following steps:

polling each video monitoring point by a polling host to acquire video streams;

previewing the acquired video streams by the polling host, and sending the acquired video streams to a video image quality diagnostic server;

performing the video image quality diagnosis on the received video streams by the video image quality diagnostic server.

One embodiment of the present invention also discloses a video image quality diagnostic method, comprising following steps:

polling each video monitoring point by a polling host to acquire a video stream;

previewing the acquired video streams by the polling host, and taking a screenshot of a preview interface and segmenting a screenshot image to obtain the image corresponding to each video monitoring point, and sending the obtained image to a video image quality diagnostic server;

performing the video image quality diagnosis on the received images by the video image quality diagnostic server.

One embodiment of the present invention also discloses a video image quality diagnostic method, comprising following steps:

polling each video monitoring point by a polling host to acquire video streams;

previewing the acquired video streams by the polling host, and storing the polling video of the corresponding monitoring point;

sending a stored polling video to a video image quality diagnostic server during the network trough by the polling host;

performing the video image quality diagnosis on a received polling video by a video image quality diagnostic server.

The embodiments described here have some features as:

On the basis of a video monitoring system, the video image quality diagnostic system is incorporated into the video monitoring system as a dedicated diagnostic network, thus effectively reducing the bandwidth consumption of the video monitoring system and the connecting port consumption of the monitoring device.

While polling each video monitoring point to view the video image, the polling host takes a screenshot of the software interface, then segments the screenshot image, and transmit the image to the video image quality diagnostic server for diagnosis via the dedicated diagnostic network, which can further reduce the bandwidth consumption of the dedicated diagnostic network and avoid the complexity of the video image quality diagnostic server for processing various packing and various encoding, and improve the stability of the video image quality diagnostic server.

The non real-time video image quality diagnostic system can reasonably use the bandwidth by using the peak and trough of the network bandwidth usage, which can obviously reduce the network bandwidth consumption during the network peak, and achieve the video image quality diagnostic result non real-time.

By embedding the video image quality diagnostic module into a front-end equipment, the massive network transmitting of the image data needed by the video image quality diagnosis is avoid, which does not generate bandwidth consumption on the existing video monitoring network system, and the image data needed by the video image quality diagnosis is uncompressed, so the diagnosis accuracy is improved.

A polling host polls each video monitoring point to view a video image via a software, transmits code streams to a video image quality diagnostic server for diagnosis via the dedicated diagnostic network when the same code streams has been acquired, and the transmission of the code streams do not occupy the bandwidth of the video monitoring network.

Furthermore, the polling host uses dual network adapters, and connects with the video monitoring network and the dedicated diagnostic network, respectively. The transmission of code streams does not occupy the bandwidth of the video monitoring network when transmitting the code streams to the video image quality diagnostic server for diagnosis.

Furthermore, the polling period is more than 10 or 20 seconds in which the required video streams are enough for the video image quality diagnostic server to complete diagnosis once.

Furthermore, by using the image diagnosis method, the bandwidth consumption of the dedicated diagnostic network is further reduced, and the complexity of the video image quality diagnostic server for processing various packing and various encoding is avoided, and then the stability of the video image quality diagnostic server is improved.

DETAILED DESCRIPTION OF THE INVENTION

The following description provides plenty of technical details for readers to better understand this application. Those who skilled in the art will understand, however, these technical solutions required to be protected in the claims of the present invention can be practiced without many of these specific technical details and all kinds of changes and modifications which are based on following embodiments.

Embodiments of the present invention will be further described in detail by referring to drawings, so that the purpose, technical solution and advantages of the present invention will become clear.

Figure 1:
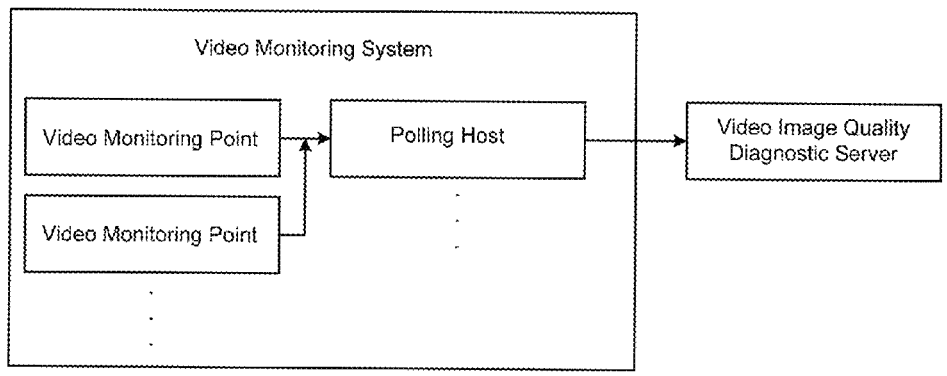
FIG. 1 is a structure diagram of a video image quality diagnostic system according to a first embodiment of the present invention.

The first embodiment of the present invention relates to a video image quality diagnostic system. FIG. 1 is a structure diagram of the video image quality diagnostic system.

Specifically, as shown in FIG. 1, the video image quality diagnostic system comprises:

a video monitoring system and a video image quality diagnostic server.

The video monitoring system includes at least two video monitoring points and at least one polling host.

The polling host is configured to poll each video monitoring point to acquire video streams and then perform the video preview, and send the acquired video streams to the video image quality diagnostic server.

The polling host adopts dual network adapters, and connects with the video monitoring point and the video image quality diagnostic server, respectively.

Further, it should be understood that the network connecting the polling host with each front-end and each back-end equipment forms a video monitoring network. The network connecting the video image quality diagnostic server and the video image quality diagnosis related network server and database server is called the dedicated diagnostic network.

The polling host adopts dual network adapters, and connects with the video monitoring network and the dedicated diagnostic network, respectively, and the transmission of the code streams do not occupy the bandwidth of the video monitoring network when transmitting the code streams to the video image quality diagnostic server for diagnosis.

This is only a preferred embodiment, and the polling host may not adopt the technology of dual network adapters in other embodiments of the present invention, for example, the poll host and the video image quality diagnostic server are in the same high-speed LAN. Thus, the code stream transmission will also not occupy the bandwidth of the video monitoring network and does not affect the quality of the video monitoring, when the polling host sending video streams to the video image quality diagnostic server.

The video image quality diagnostic server is configured to receive the video streams and perform the video image quality diagnosis on at least part of the received video streams.

On the basis of a video monitoring system, the video image quality diagnostic system is incorporated into the video monitoring system as a dedicated diagnostic network, thus effectively reducing the bandwidth consumption of the video monitoring system and the connecting port consumption of the monitoring device.

Figure 2:
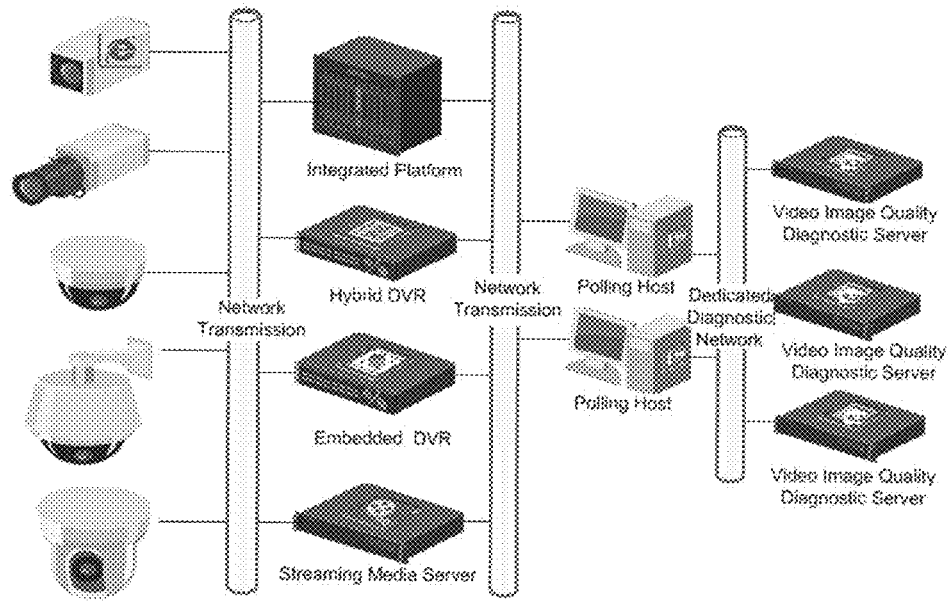
FIG. 2 is a network topology of a video image quality diagnostic system according to a first embodiment of the present invention.

In summary, the solution presents a video image quality diagnostic system based on a video monitoring system to reduce the bandwidth consumption and the connection port consumption of the monitoring device, its network topology is shown in FIG. 2.

In the video monitoring system, there are one or more polling hosts for polling viewing a video screen. In this solution, a dual-NIC computer is used as the polling host, and the network connecting the polling host with each front-end and each back-end equipment is called as a video monitoring network; the network connecting the video image quality diagnostic server and the video image quality diagnosis related network server and database server is called a dedicated diagnostic network.

In the video monitoring network, the polling host polls each video monitoring point via software to view a video image via a software, and transmits a code stream to a video image quality diagnostic server for diagnosis via the dedicated diagnostic network when the same code streams have been acquired, which does not need to acquire the code streams by connecting the monitoring device again, and the transmission of the code streams do not occupy the bandwidth of the video monitoring network. In the existing video monitoring system, the polling period is always more than 10 or 20 seconds in which the video streams required are enough for the video image quality diagnostic server to complete diagnosis once.

Figure 3:
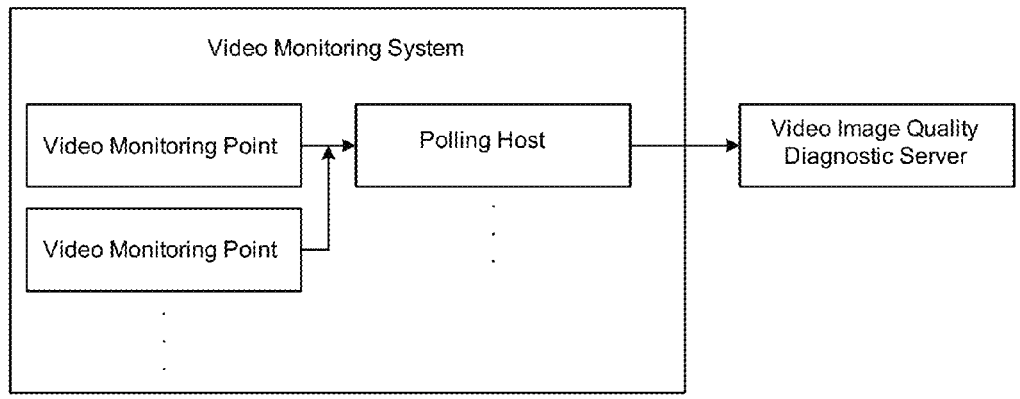
FIG. 3 is a structure diagram of a video image quality diagnostic system according to a second embodiment of the present invention.

The second embodiment of the present invention relates to a video image quality diagnostic system. FIG. 3 is a structure diagram of the video image quality diagnostic system.

Specifically, as shown in FIG. 3, the video image quality diagnostic system comprises:

A video monitoring system and a video image quality diagnostic server.

The video monitoring system includes at least two video monitoring points and at least one polling host.

The polling host is configured to poll each video monitoring point to acquire video streams and then perform the video preview, and take a screenshot on the preview screen and segment a screenshot image to obtain the image corresponding to each video monitoring point, and send the obtained image to the video image quality diagnostic server.

The video image quality diagnostic server is configured to receive the image and perform the video image quality diagnosis on the received images.

While polling each video monitoring point to view the video image, the polling host takes a screenshot of the software interface, then segments the screenshot image, and transmit the image to the video image quality diagnostic server for diagnosis via the dedicated diagnostic network, which can further reduce the bandwidth consumption of the dedicated diagnostic network and avoid the complexity of the video image quality diagnostic server for processing various packing and various encoding, and improve the stability of the video image quality diagnostic server.

In the video monitoring network, the polling host polls each video monitoring point to require code streams and view a video screen via a software, meanwhile takes a screenshot on the preview screen and segments a screenshot image to obtain the image corresponding to a single-channel video, and then send the obtained one image or multiple images to the video image quality diagnostic server for diagnosis via the dedicated diagnostic network.

Figure 4:
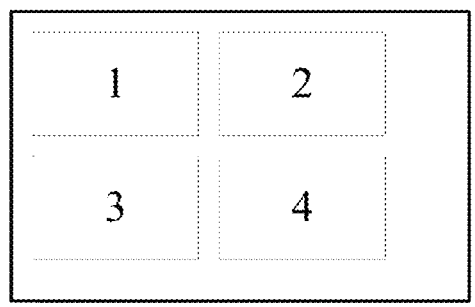
FIG. 4 is a schematic diagram of the preview interface of a polling host in a video image quality diagnostic system according to a second embodiment of the present invention.
Figure 5:
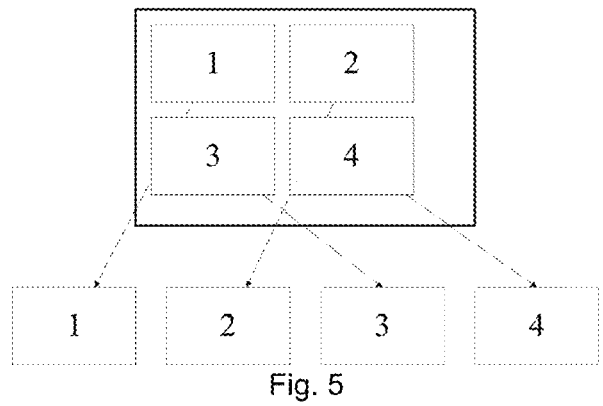
FIG. 5 is a schematic diagram of segmenting the screenshot of the preview interface of a polling host in a video image quality diagnostic system to the image corresponding to each preview window according to a second embodiment of the present invention.
Figure 6:
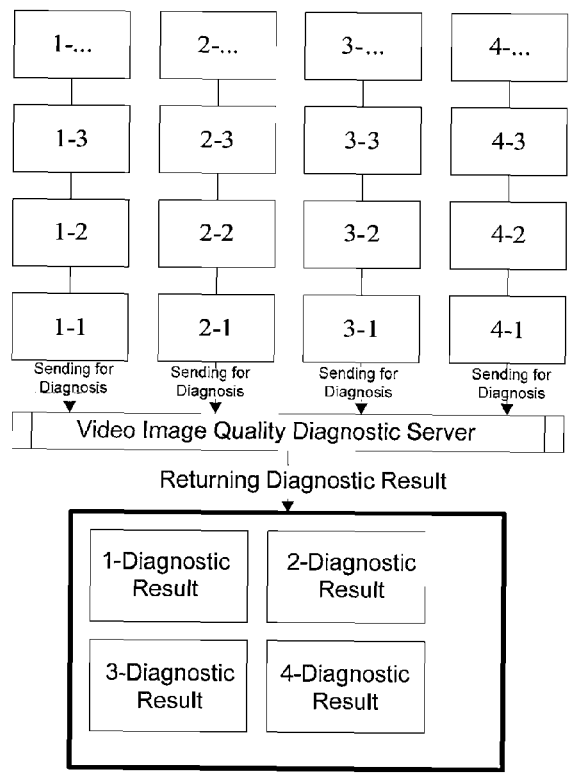
FIG. 6 is a schematic diagram of transmitting the image sequence corresponding to each polling preview window into a video image quality diagnostic server for diagnosis according to a second embodiment of the present invention.

The working process of the system is described with following examples. Assumed that the monitoring software polling reviews four video channels, and of course, the four video channels is just preferred, it may adopt other number of channels. FIG. 4 is a schematic diagram of the display screen of a polling host. Black border indicates a software interface, and area1, area2, area3 and area4 respectively represent the previewing window area of the four channel polling videos. The position of each area in the coordinate system of the display screen can be given by the monitoring software. Then a screenshot operation on the display screen is performed via functions of an operating system, as shown in FIG. 5. Then the screenshot image of the display screen is segmented to obtain the image showing the position of each polling preview window according to the obtained coordinate of each area. As shown in FIG. 6, based on these operations, an image sequence of a channel of polling video in one polling period can be acquired with, then the image sequence corresponding to each channel of polling video is transmitted to the video image quality diagnostic server for diagnosis, and the result will be returned. As shown in FIG. 6, 1-1 indicates the first image of the first channel video, 1-2 indicates the second image of the first channel video, 1-3 indicates the third image of the first channel video, 2-1 indicates the first image of the second channel video, 2-2 indicates the second image of the second channel video and so on. Moreover, the monitoring software itself has already known the information of the monitoring point corresponding to each channel of polling video, comprising device IP and channel number, etc. Thus the diagnostic result can be directly associated with the monitoring point, and the monitoring software can perform displaying, alarming and recording operation, etc., by using the diagnosis information.

Based on the first embodiment, this embodiment can further reduce the bandwidth consumption of the dedicated diagnostic network, and avoid the complexity caused by the video monitoring system for becoming compatible with various packing and various encoding in the video monitoring system, and then improve the stability of the video image quality diagnostic server.

The first embodiment is the method embodiment corresponding to this embodiment, and this embodiment can be implemented by co-operating with the first embodiment. Related technical details mentioned in the first embodiment, which are not repeated here for reducing duplication, are still valid in this embodiment. Accordingly, related technical details mentioned in this embodiment can also be used in the first embodiment.

Figure 7:
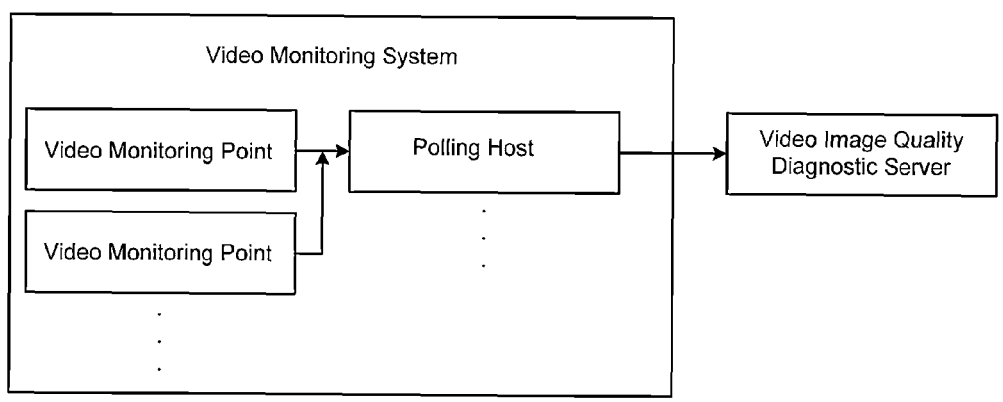
FIG. 7 is a structure diagram of a video image quality diagnostic system according to a third embodiment of the present invention.

The third embodiment of the present invention relates to a video image quality diagnostic system. FIG. 7 is a structure diagram of the video image quality diagnostic system.

Specifically, as shown in FIG. 7, the video image quality diagnostic system comprises:

A video monitoring system and a video image quality diagnostic server.

The video monitoring system includes at least two video monitoring points and at least one polling host.

The polling host is configured to poll each video monitoring point to acquire video streams and perform the video preview, and store the polling video of the corresponding monitoring point, then send the stored polling video to the video image quality diagnostic server during network trough.

The video image quality diagnostic server is configured to receive the polling video and perform the video image quality diagnosis on the received polling video.

Figure 8:
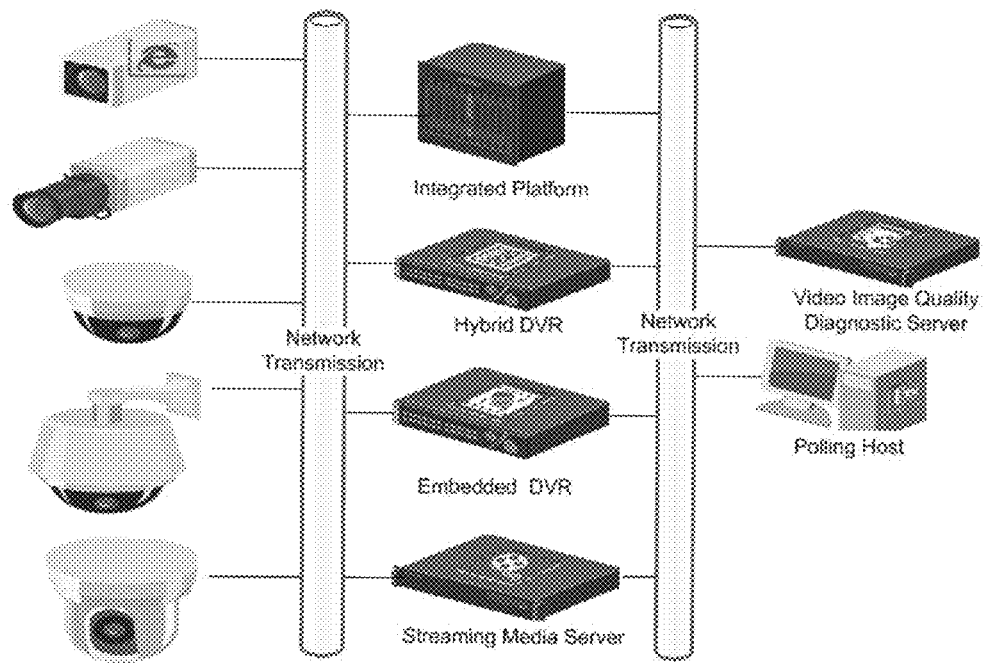
FIG. 8 is a network topology of a video image quality diagnostic system according to a third embodiment of the present invention.

Furthermore, the polling host and the video image quality diagnostic server are in the same network, and the whole bandwidth of this network is limited, and the network topology of this network is shown in FIG. 8. The polling host and the video image quality diagnostic server are in the same network, and the bandwidth of this network is limited.

Figure 9:
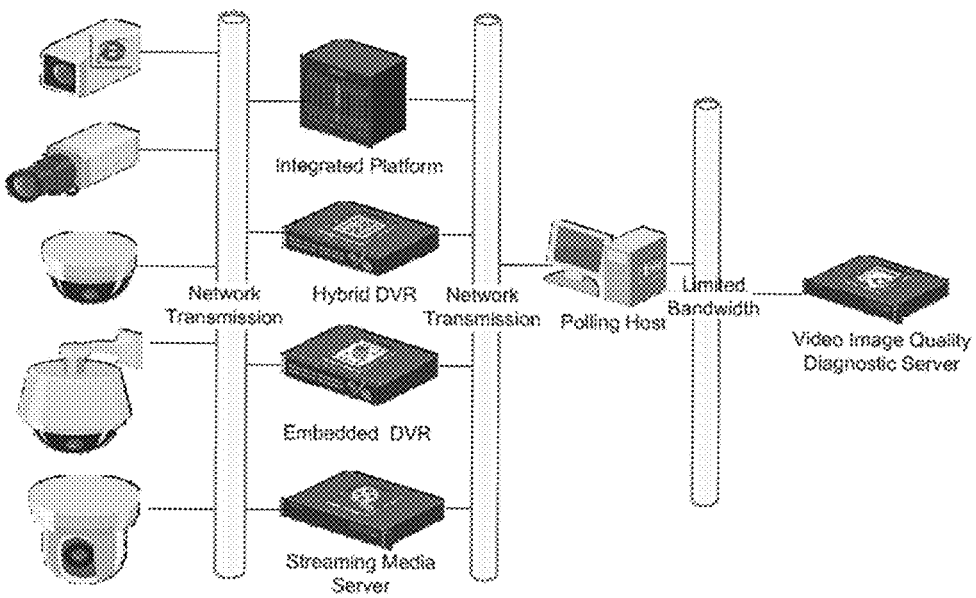
FIG. 9 is a network topology of a video image quality diagnostic system according to a third embodiment of the present invention.

FIG. 9 is another network topology of the video image quality diagnostic system, which is consistent with the network topology shown in the FIG. 2, but the network bandwidth between the video monitoring network and the dedicated diagnostic network is limited.

The real-time video image quality diagnosis cannot be implemented during the network peak in two circumstances shown in FIG. 8 and FIG. 9. However, based on a precondition that any one of architecture design will ensure the video polling of the polling host being reasonably implemented, the working steps of the non real-time video image quality diagnostic system approved in this solution are:

1. During the network peak, for example, the working hours of the day, the polling host adopts a reasonable number of channels to implement the video polling, and store the monitoring point corresponded polling video. For example, if the polling cycle is 20, then each monitoring point store 20 seconds video;

2. During the network trough, for example, evenings and non-working hours, the polling host transmits the stored video to the video image quality diagnostic server, or the video image quality diagnostic server actively acquired the polling video from the polling host;

3. The received data is diagnosed by the video image quality diagnostic server and then the diagnostic result is sent to achieve the purpose of non real-time implementing the video image quality diagnosis.

4. It can also use above image diagnosis method to achieve the purpose of non real-time implementing the video image quality diagnosis.

The non real-time video image quality diagnostic system can reasonably use the bandwidth using the peak and trough of the network bandwidth usage, which can obviously reduce the network bandwidth consumption during the network peak, and achieve the video image quality diagnostic result non real-time.

The first embodiment and the second embodiment are the method embodiments corresponding to this embodiment, and this embodiment can be implemented by co-operating with the first embodiment and the second embodiment. Related technical details mentioned in the first embodiment and the second embodiment, which are not repeated here for reducing duplication, are still valid in this embodiment. Accordingly, related technical details mentioned in this embodiment can also be used in the first and the second embodiment.

Figure 10:
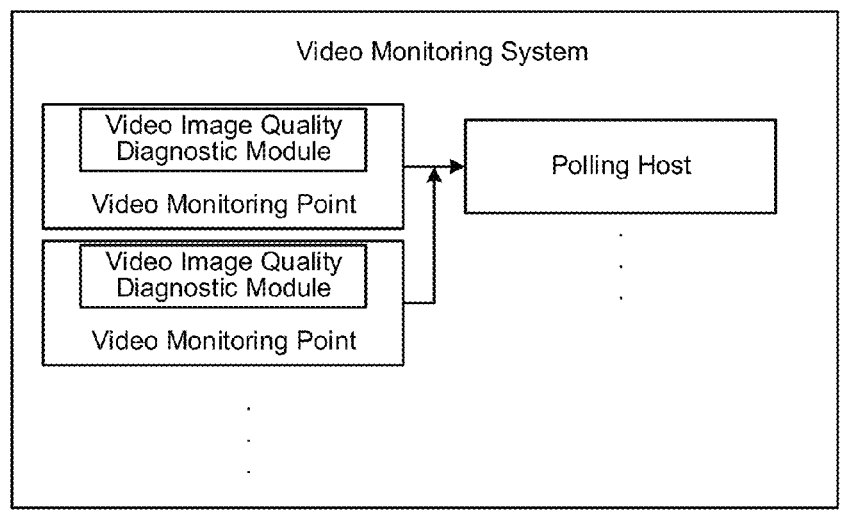
FIG. 10 is a structure diagram of a video image quality diagnostic system according to a fourth embodiment of the present invention.

The fourth embodiment of the present invention relates to a video image quality diagnostic system. FIG. 10 is a structure diagram of the video image quality diagnostic system.

Specifically, as shown in FIG. 10, the video image quality diagnostic system comprises:

A video monitoring system and a video image quality diagnostic module.

The video monitoring system includes at least two video monitoring points and at least one polling host.

The polling host is configured to poll each video monitoring point to acquire video streams and perform the video preview.

The video image quality diagnostic module is embedded in an image capture device of the video monitoring point and is configured to perform the video image quality diagnosis on an image captured by the image capture device.

By embedding the video image quality diagnostic module into a front-end equipment, the massive network transmitting of the image data needed by the video image quality diagnosis is avoided, which does not generate bandwidth consumption on the existing video monitoring network system, and the image data needed by the video image quality diagnosis is uncompressed, so the diagnosis accuracy is improved.

Figure 11:
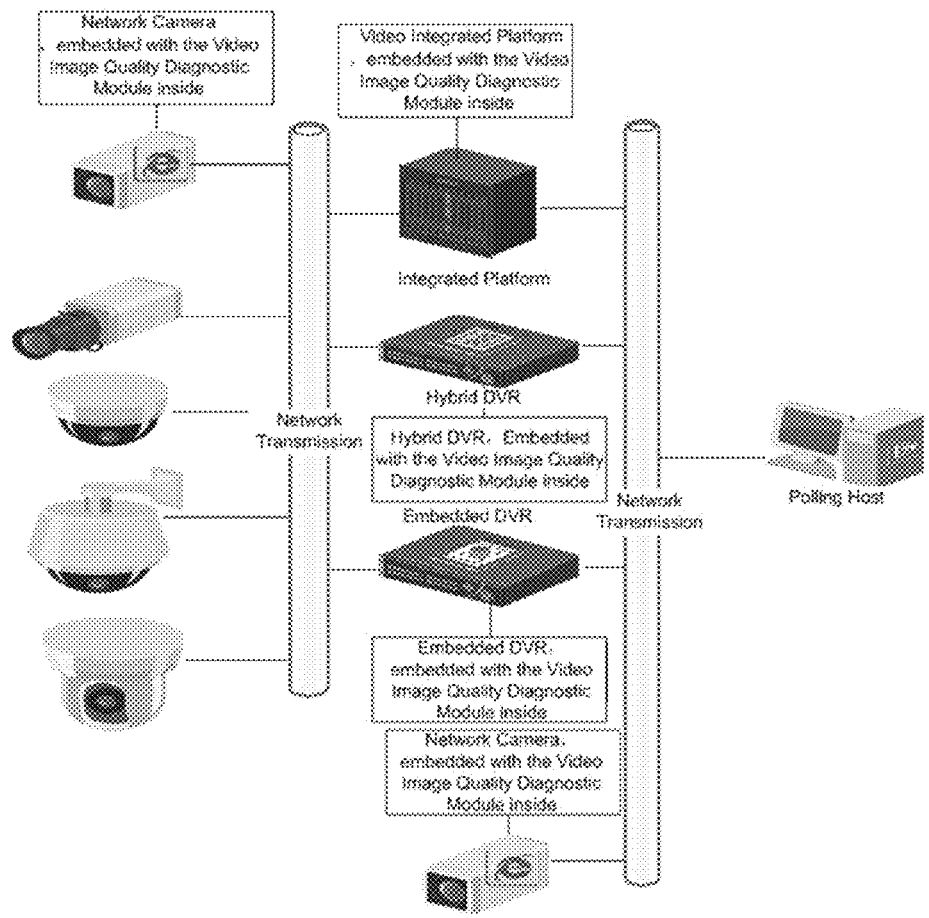
FIG. 11 is a network topology of a video image quality diagnostic system according to a fourth embodiment of the present invention.

FIG. 11 is a network topology of the video image quality diagnostic system, and the video image quality diagnostic module is embedded on a network camera, various digital video recorders (referred to as DVR) or digital video servers (referred to as DVS), and other image data capture device.

The network camera is embedded with the video image quality diagnostic module, and the analog camera embeds the video image quality diagnostic module on the DVR, DVS and other image data capture device which are connecting with the analog camera. One monitoring software can require the result of the video image quality diagnosis only by calling interface functions. This method captures uncompressed image data to perform video image quality diagnosis on the device, thus, the diagnostic accuracy is improved and the massive network transmitting of the image data needed by the video image quality diagnosis is avoided, then no extra bandwidth consumption is add to the existing video monitoring network system.

The first embodiment, the second embodiment and the third embodiment are the method embodiments corresponding to this embodiment, and this embodiment can be implemented by co-operating with the first embodiment, the second embodiment and the third embodiment. Related technical details mentioned in the first embodiment, the second embodiment and the third embodiment, which are not repeated here for reducing duplication, are still valid in this embodiment. Accordingly, related technical details mentioned in this embodiment can also be used in the first, the second embodiment and the third embodiment.

It should be illustrated that each module mentioned in each embodiment of the present invention is the logic module. Physically, a logical module can be a physical module, or a part of a physical module, or implemented by combining multiple physical modules. The physical implementation of these modules is not most important, while the combined function implemented by these modules is the key to solve the technical problems proposed in the present invention. Moreover, to highlight the innovative part of the present invention, although the module, which is less closely related with the technical problems proposed in the present invention, is not introduced in the above system embodiments, this is not indicated that there no other modules existing in the above system embodiments.

Figure 12:
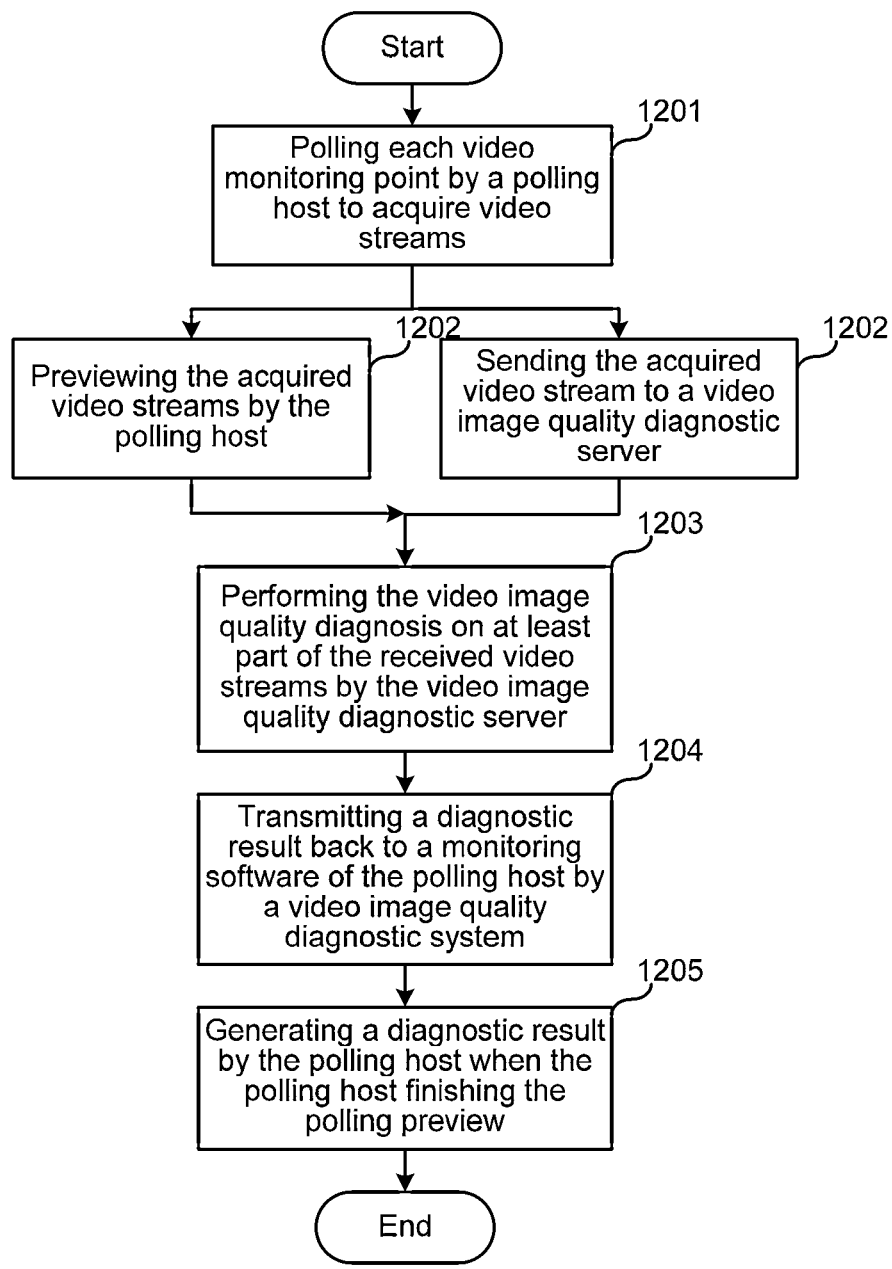
FIG. 12 is a flow chart diagram of a video image quality diagnostic method according to a fifth embodiment of the present invention.

The fifth embodiment of the present invention relates to a video image quality diagnostic method. FIG. 12 is a flow chart diagram of the video image quality diagnostic method.

Specifically, as shown in FIG. 12, the video image quality diagnostic method comprises following steps:

In step 1201, polling each video monitoring point by a polling host to acquire video streams.

Furthermore, it should be understood that the video monitoring point is the camera installed in the monitoring site, and the polling host can poll each video monitoring point by a digital video recorder or other ways.

In step 1201, the polling host polls each video monitoring point with a period of more than 10 or 20 seconds.

The polling period is more than 10 or 20 seconds in which the video streams required is enough for a video image quality diagnostic server to complete diagnosis once.

Then proceeds to step 1202, previewing the acquired video streams by the polling host, and sending the acquired video streams to a video image quality diagnostic server.

Then proceeds to step 1203, performing the video image quality diagnosis on at least part of the received video streams by the video image quality diagnostic server.

Preferably, the method may include following steps after the step 1203:

In step 1204, transmitting a diagnostic result back to a monitoring software of the polling host by a video image quality diagnostic system.

Then proceeds to step 1205, generating the diagnostic result by the polling host when the polling host finishing the polling preview.

Then ends this flow.

A polling host polls each video monitoring point to view a video image via a software, transmits code streams to a video image quality diagnostic server for diagnosis via the dedicated diagnostic network when the same code streams have been acquired, and the transmission of the code streams do not occupy the bandwidth of the video monitoring network.

This embodiment is the method embodiment corresponding to the first embodiment, and this embodiment can be implemented by co-operating with the first embodiment. Related technical details mentioned in the first embodiment, which are not repeated here for reducing duplication, are still valid in this embodiment. Accordingly, related technical details mentioned in this embodiment can also be used in the first embodiment.

Figure 13:
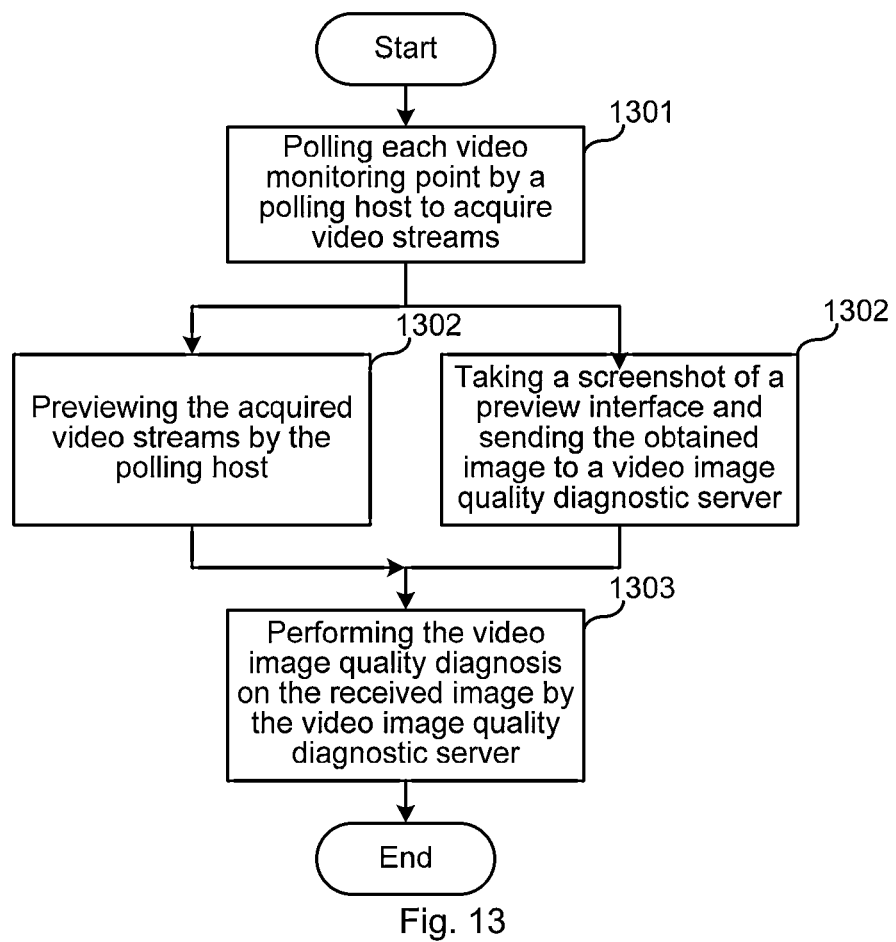
FIG. 13 is a flow chart diagram of a video image quality diagnostic method according to a sixth embodiment of the present invention.

The sixth embodiment of the present invention relates to a video image quality diagnostic method. FIG. 13 is a flow chart diagram of the video image quality diagnostic method.

Specifically, as shown in FIG. 13, the video image quality diagnostic method comprises following steps:

In step 1301, polling each video monitoring point by a polling host to acquire video streams.

Then proceeds to step 1302, previewing the acquired video streams by the polling host, and taking a screenshot of a preview interface and segmenting a screenshot image to obtain the image corresponding to each video monitoring point, and sending the obtained image to a video image quality diagnostic server.

Then proceeds to step 1303, performing the video image quality diagnosis on the received image by the video image quality diagnostic server.

Then ends this flow.

While polling each video monitoring point to view the video image, the polling host takes a screenshot of the software interface, then segments the screenshot image, and transmit the image is to the video image quality diagnostic server for diagnosis via the dedicated diagnostic network, which can further reduce the bandwidth consumption of the dedicated diagnostic network and avoid the complexity of the video image quality diagnostic server for processing various packing and various encoding, and improve the stability of the video image quality diagnostic server.

This embodiment is the method embodiment corresponding to the second embodiment, and this embodiment can be implemented by co-operating with the second embodiment. Related technical details mentioned in the second embodiment, which are not repeated here for reducing duplication, are still valid in this embodiment. Accordingly, related technical details mentioned in this embodiment can also be used in the second embodiment.

Figure 14:
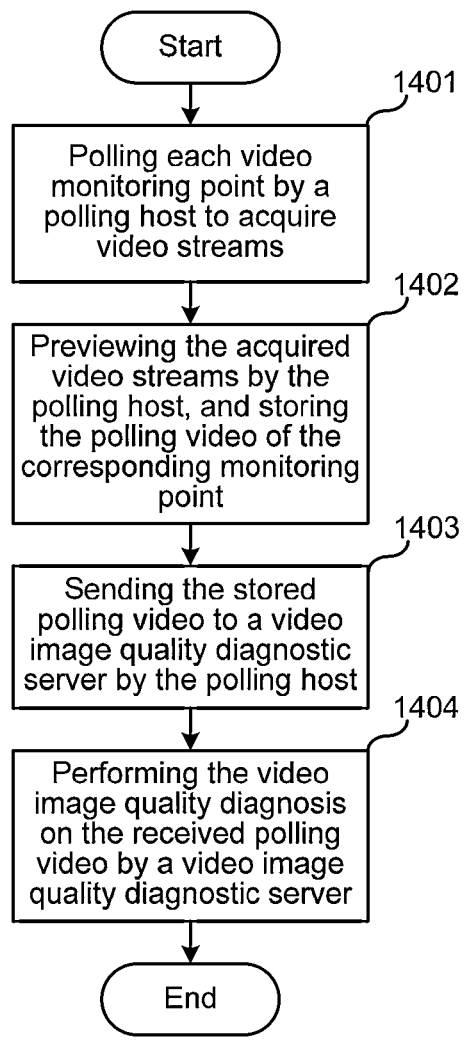
FIG. 14 is a flow chart diagram of a video image quality diagnostic method according to a seventh embodiment of the present invention.

The seventh embodiment of the present invention relates to a video image quality diagnostic method. FIG. 14 is a flow chart of the video image quality diagnostic method.

In this embodiment, a polling host and a video image quality diagnostic server are in the same network, and the bandwidth of the network is limited.

Specifically, as shown in FIG. 14, the video image quality diagnostic method includes following steps:

In step 1401, polling each video monitoring point by a polling host to acquire video streams.

Then proceeds to the step 1402, previewing the acquired video streams by the polling host, and storing the polling video of the corresponding monitoring point.

Then proceeds to step 1403, sending the stored polling video to a video image quality diagnostic server during the network trough by the polling host.

Then proceeds to step 1404, performing the video image quality diagnosis on the received polling video by a video image quality diagnostic server.

Then ends this flow.

The non real-time video image quality diagnostic method can reasonably use the bandwidth using the peak and trough of the network bandwidth usage, which can obviously reduce the network bandwidth consumption during the peak network using period, and achieve the video image quality diagnostic result non real-time.

Preferably, the step 1402 may include following substeps:

Taking a screenshot of a preview interface and segmenting a screenshot image to obtain the image corresponding to each video monitoring point while previewing the acquired video stream, and then storing the obtained image, by the polling host.

By using the image diagnosis method, the bandwidth consumption of the dedicated diagnostic network is further reduced, and the complexity of processing various packages and various encoding of the video image quality diagnostic server is avoided, then the stability of the video image quality diagnostic server is improved.

This embodiment is the method embodiment corresponding to the third embodiment, and this embodiment can be implemented by co-operating with the third embodiment. Related technical details mentioned in the third embodiment, which are not repeated here for reducing duplication, are still valid in this embodiment. Accordingly, related technical details mentioned in this embodiment can also be used in the third embodiment.

The method embodiments of this invention all can be implemented by software, hardware and firmware etc. No matter this invention is implemented by software, or hardware, or firmware, instruction codes all can be stored in the memory (such as permanent or revisable, volatile or non-volatile, solid or non solid, fixed or exchangeable media .etc.) that any type of computers can access. Likewise, the memory can be such as programmable array logic (PAL), random access memory (RAM), programmable read only memory (PROM), read-only memory (ROM), electrically erasable programmable ROM (EEPROM), floppy disc, optical disc, and digital versatile disc (DVD) .etc.

It should be illustrated that relationship terms, e.g. first and second etc, only are used to distinguish one substance or operation from another substance or operation in claims and description of the present invention, rather than require or suggest that any practical relationships or orders exist between these substances or operations. Moreover, terms "comprising", "containing" or any other variants mean to include non-exclusive containing, so that processes, methods, objects or apparatus containing a series of elements not only include these elements but also other elements that are not clearly shown or inherent elements of these processes, methods, objects or apparatus. If there is no more limitation, elements limited by the phrase "include a" do not exclude other same elements in processes, methods, objects or apparatus containing these elements.

Although the present invention has been illustrated and described by referring to some preferred embodiments of the present invention, it should be understood by those skilled in the art that various other changes in forms and details may be made without departing from the principles and scope of the present invention.

The invention claimed is:

1. A video image quality diagnostic system, comprising: a video monitoring system and a video image quality diagnostic server;

the video monitoring system includes at least two video monitoring points and at least one polling host;

the polling host is configured to poll each video monitoring point to acquire video streams and then perform the video preview, and send the acquired video streams to the video image quality diagnostic server;

the video image quality diagnostic server is configured to receive the video streams and perform the video image quality diagnosis on at least part of the received video streams.

2. The video image quality diagnostic system according to claim 1, wherein, the polling host adopts dual network adapters, and connects with the video monitoring point and the video image quality diagnostic server, respectively.

3. A video image quality diagnostic system, comprising: a video monitoring system and a video image quality diagnostic server;

the video monitoring system includes at least two video monitoring points and at least one polling host;

the polling host is configured to poll each video monitoring point to acquire video streams and then perform the video preview, and take a screenshot on the preview screen and segment a screenshot image to obtain the image corresponding to each video monitoring point, and send the obtained image to the video image quality diagnostic server;

the video image quality diagnostic server is configured to receive the image and perform the video image quality diagnosis on the received image.

4. A video image quality diagnostic system, comprising: a video monitoring system and a video image quality diagnostic server;

the video monitoring system includes at least two video monitoring points and at least one polling host;

the polling host is configured to poll each video monitoring point to acquire video streams and perform the video preview, and store the polling video of the corresponding monitoring point, then send the stored polling video to the video image quality diagnostic server during the network trough;

the video image quality diagnostic server is configured to receive the polling video and perform the video image quality diagnosis on the received polling video.

5. The video image quality diagnostic system according to claim 4, wherein, the polling host and the video image quality diagnostic server are in the same network, and the whole bandwidth of this network is limited.

6. A video image quality diagnostic system, comprising: a video monitoring system and a video image quality diagnostic module;

the video monitoring system includes at least two video monitoring points and at least one polling host;

the polling host is configured to poll each video monitoring point to acquire video streams and perform the video preview;

the video image quality diagnostic module is embedded in an image capture device of the video monitoring point and is configured to perform the video image quality diagnosis on the image captured by the image capture device.

7. A video image quality diagnostic method, comprises following steps:

polling each video monitoring point by a polling host to acquire video streams;

previewing the acquired video streams by the polling host, and sending the acquired video streams to a video image quality diagnostic server;

performing the video image quality diagnosis on at least part of the received video streams by the video image quality diagnostic server.

8. The video image quality diagnostic method according to claim 7, wherein, after the step of performing a video image quality diagnosis on the received video stream by the video image quality diagnostic server, the method further comprises following steps:
    transmitting a diagnostic result back to a monitoring software of the polling host by a video image quality diagnostic system;
    generating a diagnostic result by the polling host when the polling host finishing a polling preview.

9. The video image quality diagnostic method according to claim 8, wherein, in the step of polling each video monitoring point by a polling host, the polling period is more than 10 or 20 seconds.

10. A video image quality diagnostic method, comprises following steps:
    polling each video monitoring point by a polling host to acquire video streams;
    previewing the acquired video streams by the polling host, and taking a screenshot of a preview interface and segmenting a screenshot image to obtain the image corresponding to each video monitoring point, and sending the obtained image to a video image quality diagnostic server;
    performing the video image quality diagnosis on the received image by the video image quality diagnostic server.

11. A video image quality diagnostic method, wherein, includes following steps:
    polling each video monitoring point by a polling host to acquire video streams;
    previewing the acquired video streams by the polling host, and storing the polling video of the corresponding monitoring point;
    sending the stored polling video to a video image quality diagnostic server during the network trough by the polling host;
    performing the video image quality diagnosis on the received polling video by a video image quality diagnostic server.

12. The video image quality diagnostic method according to claim 11, wherein, the polling host and the video image quality diagnostic server are in the same network, and the bandwidth of the network is limited.

13. The video image quality diagnostic method according to claim 12, wherein, the step of previewing the acquired video stream by the polling host, and storing the polling video of the corresponding monitoring point includes following sub-steps:
    taking a screenshot of a preview interface and segmenting a screenshot image to obtain the image corresponding to each video monitoring point while previewing the acquired video stream, and then storing the obtained image, by the polling host.

* * * * *